US009998279B2

(12) United States Patent
Michiels et al.

(10) Patent No.: US 9,998,279 B2
(45) Date of Patent: Jun. 12, 2018

(54) ELECTRONIC BLOCK CIPHER DEVICE SUITABLE FOR OBFUSCATION

(71) Applicant: KONINKLIJKE PHILIPS N.V., Eindhoven (NL)

(72) Inventors: Wilhelmus Petrus Adrianus Johannus Michiels, Reusel (NL); Paulus Mathias Hubertus Mechtildis Antonius Gorissen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 150 days.

(21) Appl. No.: 14/784,182

(22) PCT Filed: Apr. 17, 2014

(86) PCT No.: PCT/EP2014/057953
§ 371 (c)(1),
(2) Date: Oct. 13, 2015

(87) PCT Pub. No.: WO2014/177400
PCT Pub. Date: Nov. 6, 2014

(65) Prior Publication Data
US 2016/0050065 A1    Feb. 18, 2016

(30) Foreign Application Priority Data

May 1, 2013   (EP) .................... 13166098

(51) Int. Cl.
*H04L 9/06* (2006.01)
*H04L 9/00* (2006.01)
(Continued)

(52) U.S. Cl.
CPC .......... *H04L 9/0618* (2013.01); *H04L 9/0631* (2013.01); *H04L 2209/16* (2013.01); *H04L 2209/24* (2013.01)

(58) Field of Classification Search
CPC ... H04L 2209/16; H04L 9/002; H04L 9/0631; H04L 2209/24; H04L 9/0618; G06F 21/14
See application file for complete search history.

(56) References Cited

U.S. PATENT DOCUMENTS

| 2010/0080395 | A1* | 4/2010 | Michiels | ................. H04L 9/002 380/278 |
| 2011/0176678 | A1* | 7/2011 | Choi | ..................... H04L 9/0631 380/259 |

(Continued)

FOREIGN PATENT DOCUMENTS

| JP | H00697930 A | 4/1994 |
| JP | 2003298572 A | 10/2003 |

(Continued)

OTHER PUBLICATIONS

Chow S., Eisen P., Johnson H., Van Oorschot P.C. (2003) White-Box Cryptography and an AES Implementation. In: Nyberg K., Heys H. (eds) Selected Areas in Cryptography. SAC 2002. Lecture Notes in Computer Science, vol. 2595. Springer, Berlin, Heidelberg.*

(Continued)

*Primary Examiner* — Alexander Lagor

(57) ABSTRACT

An electronic block cipher device for encrypting or decrypting a message block of digital data comprising a storage unit storing multiple substitution boxes in the form of look-up tables, the multiple substitution boxes together forming a substitution layer of a block cipher, the substitution layer being arranged to take a substitution layer input and transforming it into a substitution layer output, at least one substitution box being arranged to receive as input a combination of at least part of the outputs of more than one further substitution boxes in the same substitution layer, a control unit configured to apply the block cipher to the (Continued)

message block of digital data by applying a sequence of block cipher rounds to the message block, one of the block cipher rounds comprising the substitution layer.

10 Claims, 6 Drawing Sheets

(51) Int. Cl.
*G06F 12/08* (2016.01)
*G06F 21/00* (2013.01)

(56) References Cited

U.S. PATENT DOCUMENTS

| | | |
|---|---|---|
| 2012/0002807 A1 | 1/2012 | Michiels et al. |
| 2012/0121083 A1 | 5/2012 | You et al. |
| 2012/0155638 A1 | 6/2012 | Farrugia et al. |
| 2012/0300922 A1 | 11/2012 | Billet et al. |

FOREIGN PATENT DOCUMENTS

| | | |
|---|---|---|
| JP | 2008514975 A | 5/2008 |
| JP | 2012530269 A | 11/2012 |
| RU | 2467389 C1 | 11/2012 |
| WO | 0246890 A2 | 6/2002 |
| WO | 2006033013 A2 | 3/2006 |
| WO | 2010146139 A1 | 12/2010 |
| WO | 2014096117 A1 | 6/2014 |
| WO | 2012129639 A2 | 10/2014 |

OTHER PUBLICATIONS

Wyseur B., Michiels W., Gorissen P., Preneel B. (2007) Cryptanalysis of White-Box DES Implementations with Arbitrary External Encodings. In: Adams C., Miri A., Wiener M. (eds) Selected Areas in Cryptography. SAC 2007. Lecture Notes in Computer Science, vol. 4876. Springer, Berlin, Heidelberg.*
H. E. Link and W. D. Neumann, "Clarifying obfuscation: improving the security of white-box DES," International Conference on Information Technology: Coding and Computing (ITCC'05)—vol. II, 2005, pp. 679-684 vol. 1.*
Chow et al: "White-Box Cryptography and as AES Implementation"; Selected Areas in Cryptography:9th Annual International Workshop; SAC 2002, LNCS 2595, pp. 250-2070, 2003.
Chow et al: "A White-Box DES Implementation for DRM Applications"; Pre-Donf Rectord for ACM DRM-2 Workshop, Oct. 2002, pp. 1-16.
Barretto et al: "The Khazad Legacy-Level Block Cipher"; Scopus Tecnologia S.A., Sao Paolo, Brazil, Cyrptomathic N.V., Leuven, Belgium; Sep. 2001, 20 Page Document.
Michiels et al: "Cryptanalysis of a Generic Class of Whitte-Box Implementations"; SAC 2008, LNCS 5381, pp. 414-428, 2009.
Vergili et al: "Avalanche and Bit Independence Properties for the Ensembles of Randomly Chosen nxn S-Boxes"; EE Department of Metu, 2001, pp. 1-18.

* cited by examiner

Figure 1a  BLOCK CIPHER 100

ELECTRONIC BLOCK CIPHER DEVICE SUITABLE FOR OBFUSCATION

CROSS-REFERENCE TO PRIOR APPLICATIONS

This application is the U.S. National Phase application under 35 U.S.C. § 371 of International Application No. PCT/EP2014/057953, filed on Apr. 17, 2014, which claims the benefit of European Patent Application No. 13166098.7, filed on May 1, 2013. These applications are hereby incorporated by reference herein.

FIELD OF THE INVENTION

The invention relates to an electronic block cipher device for encrypting or decrypting a message block of digital data comprising a storage unit storing multiple substitution boxes in the form of look-up tables, the multiple substitution boxes together forming a substitution layer of a block cipher, the substitution layer being arranged to take a substitution layer input and transforming it into a substitution layer output, and a control unit configured to apply the block cipher to the message block of digital data by applying a sequence of block cipher rounds to the message block, one of the block cipher rounds comprising the substitution layer.

The invention further relates to an electronic block cipher method and corresponding software.

BACKGROUND

Block ciphers are an often used primitive in cryptography. A block cipher is an algorithm for encrypting or decrypting a message block of digital data under control of a cryptographic key. The block cipher operates on message blocks of digital data of some predetermined block size, conventionally bit size. Common block sizes include 64, 128, 192, and 256 bit. The operation is a deterministic bijective (and thus invertible) operation. Known block ciphers include DES and AES.

For example, a content distribution system may encrypt content before distribution to counter piracy. Encrypted content may be distributed over less secure channels, say the Internet, whereas the key used for encryption may be distributed using more secure means, say a DRM system. However, even distribution of the key is not without risks. Even DRM implementations may be disassembled to recover their secrets, e.g., their secret keys. For this and other reasons there is a desire for a secure encryption/decryption primitive that may be protected against reverse engineering.

One way to protect a key, e.g., a key used in a DRM implementation, say a master key, may be to use an implementation of a block cipher. A white-box cipher is a software implementation of a block cipher in which the secret key is 'instantiated'. Instantiating a key in an implementation fixes the key and embeds the key in the implementation by partial evaluation with respect to the key; key input becoming unnecessary. Computations that depend on the key are evaluated so far as is possible without knowledge of the message block input. Typically, the key schedule may be computed, and the round keys may be combined with other steps. Often the round keys may be combined with a substitution layer, i.e., by adding a round key to the output of substitution boxes in a substitution layer.

Next the implementation is obfuscated. Typically this is done by expressing the instantiated cipher as a table network, and encoding of the tables of that network. The goal is that the effort of recovering the instantiated key from the white-box cipher is at least as large as a black box (e.g. brute force) attack on the underlying cipher.

One ideal solution would be to implement the cipher as one big lookup table. However, this is unworkable for practical bock ciphers. A white-box strategy that approaches this ideal was introduced in "A White-Box DES Implementation for DRM Applications" by S. Chow, P. Eisen, H. Johnson, and P. C. van Oorschot, 2002 published in the book Digital Rights Management of the Lecture Notes in Computer Science 2003. Computations, in particular block ciphers may be implemented as a network of lookup tables, randomized so that key information is spread over the entire network. Every building block may be made to be seemingly independent from the key. So that an adversary is forced to analyze the complete network in order to obtain secret key information. Obfuscation of the network of tables is possible by prepending and appending obfuscating transformations to the transformations written out in tables. In this way each individual table is randomized, while the combination of all obfuscating transformations cancels. Another example is given in "White-Box Cryptography and an AES Implementation", by Chow, Eisen and van Oorschot.

In White-box cryptography a block cipher is implemented in software such that it is difficult for an attacker to extract the key even if he has full access to the implementation. However, the inventors found that a particular kind of block cipher, the so-called Substitution-Linear Transformation Networks have vulnerabilities in this respect which makes them hard to secure using conventional white-box techniques. See the paper "Cryptanalysis of a Generic Class of White-Box Implementations" by Wil Michiels, Paul Gorissen, and Henk D. L. Hollmann for more details. The problem is related to the way SLT (Substitution-Linear Transformation) type ciphers are organized, i.e., any white-box implementation of a block cipher of the type described above using white-box techniques such as used by Chow et al., will be vulnerable.

SUMMARY OF THE INVENTION

It would advantageous to have an improved block cipher.

An electronic block cipher device is provided configured to encrypt or decrypt a message block of digital data. The block cipher device comprises a storage unit and a control unit.

The storage unit stores multiple substitution boxes in the form of look-up tables, the multiple substitution boxes together forming a substitution layer of a block cipher, the substitution layer being arranged to take a substitution layer input and transforming it into a substitution layer output, at least one substitution box being arranged to receive as input a combination of at least part of the outputs of more than one further substitution boxes in the same substitution layer.

The control unit is configured to apply the block cipher to the message block of digital data by applying a sequence of block cipher rounds to the message block, one of the block cipher rounds comprising the substitution layer.

The substitution layer is not fully parallel because at least one substitution box is arranged to receive as input a combination of at least part of the outputs of more than one further substitution boxes in the same substitution layer. This means that an input-output encoding of this layer, such as is used in white-box, cannot be eliminated, in the manner described above. More generally, it is considered undesirable that a block cipher part may be analyzed in such a straightforward manner.

The block cipher is also very well suited for use in a system such as described in U.S. patent application Ser. No. 61/740,726, filed on Dec. 21, 2012, with title "Computing device configured with a table network" of the same applicant. Furthermore, automated software obfuscation systems generally are more effective when used on software implementation block ciphers of the type described than general block ciphers.

In effect, a large non-linear function is created from smaller non-linear functions (S-boxes) in a way different from the linear transformation-layer approach described above, which is more suitable for a an implementation in a white-box attack context. A substitution box is a look-up table, arranged to take a digital input and transforming it into a digital output. Preferably, the s-box is non-linear.

Non-parallelism is also obtained by having at least one substitution box arranged so that a first part of the digital output of the at least one substitution box is used as part of the input of a further substitution box in the same substitution layer as the at least one substitution box and so that a second part of the digital output of the at least one substitution box is used as part of the input for yet a further different substitution box in the same substitution layer.

In an embodiment, the substitution layer comprises multiple sub-layers, a first sub-layer of the multiple sub-layers being arranged to receive as input the substitution layer input, next sub-layers being arranged to receive as input the output of a previous substitution layer, and one of the next sub-layers being a last sub-layer being arranged to produce the substitution layer output. Using multiple sub-layers has been found to be an efficient way to ensure that diffusion occurs within the substitution layer.

The block cipher device may be comprised and used in a mobile electronic device, such as mobile phone. The block cipher device may be comprised and used in a set-top box, a computer, and the like.

An aspect of the invention concerns an electronic block cipher method for encrypting or decrypting a message block of digital data comprising storing multiple substitution boxes in the form of look-up tables, the multiple substitution boxes together forming a substitution layer of a block cipher, the substitution layer being arranged to take a substitution layer input and transforming it into a substitution layer output, at least one substitution box being arranged to receive as input a combination of at least part of the outputs of more than one further substitution boxes in the same substitution layer, applying the block cipher to a message block of digital data by applying a sequence block of cipher rounds to the message block, one of the block cipher rounds comprising the substitution layer.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings, FIG. 1a is a block diagram illustrating a block cipher.

DETAILED DESCRIPTION OF EMBODIMENTS

Figure 1B:
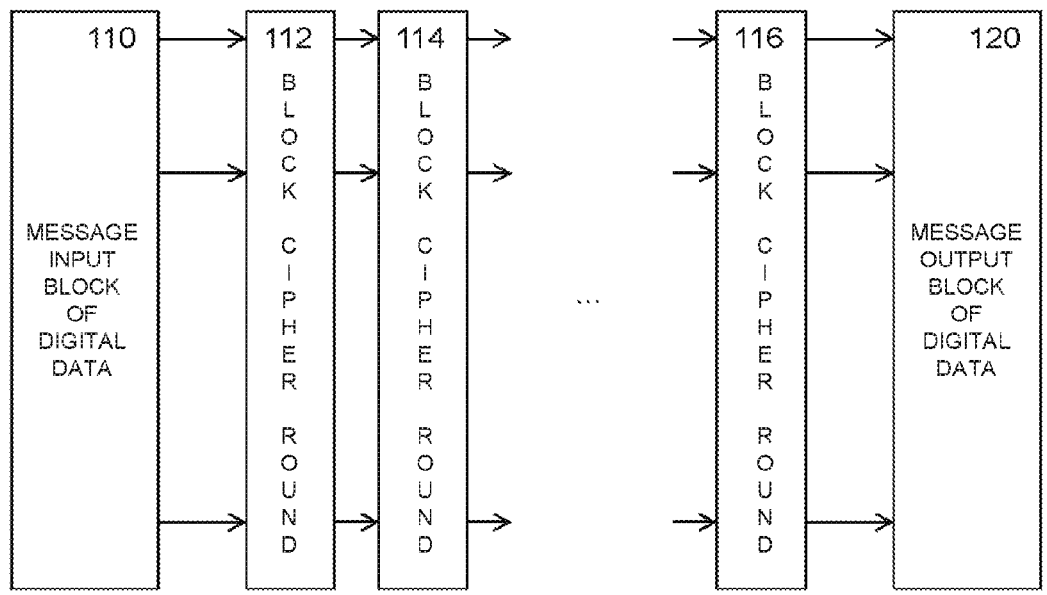
FIG. 1b is a block diagram illustrating a round of a block cipher.
Figure 1B:
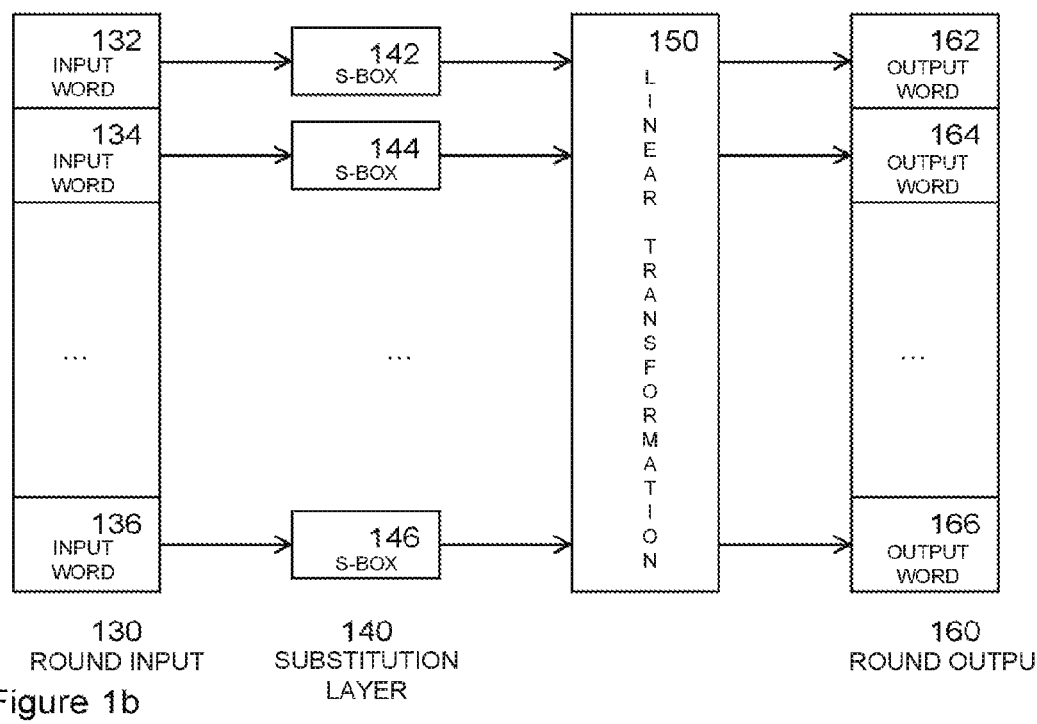

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1a shows in schematic form a block cipher. The block cipher comprises a number of rounds; shown are block cipher rounds 112, 114, and 116. The number of rounds depends on the design of the block cipher. For example, 8 or 12 or 16 rounds are sometimes used. Typically, the number of rounds is 8 or higher. Also shown is a message input block of digital data 110. The message input block is typically binary data and of a fixed block size. Common block sizes are 64, 128, 192 and 256, especially 128 is a convenient choice. The message block that is received as input may be divided words, say bytes of 8 bits each, or nibbles of 4 bits each, etc. At the end of the rounds a message output block 120 of block size is produced.

Starting from message block 110 the rounds 112-116 are sequentially applied, each round producing an intermediate result of block size. In case of FIG. 1a, first round 112 is applied to produce a first intermediate result, than round 114 is applied to the first intermediate result to produce a second intermediate result, etc. The first intermediate data block depending only on the block cipher input, and each next intermediate data block depending on the previous intermediate data block; typically rounds 114-116 only depend on the intermediate result that it receives as input and possibly a round key.

Often all block cipher rounds use the same algorithm, although sometimes the first and last rounds differ somewhat for various practical reasons. The rounds often differ because they use a different round key. The round keys may be derived from a cryptographic key using a key schedule. If the block cipher is implemented in obfuscated way, the round keys may be fixed, and the rounds partially evaluated. For example, in many block ciphers (say AES) it is possible to combine round key addition with a substitution layer. The block cipher is conveniently implemented in an electronic block cipher device.

A round may comprise a substitution layer and a linear transformation layer. In the substitution layer operation, substitution boxes (S-boxes) are applied to a data block. The linear transformation layer applies a linear transformation to the whole of the data block.

To obtain secure block ciphers one ought to implement a permutation $E_K$ (bijection) that approaches a pseudo-random function; however, the encryption function should also be efficiently implementable. Non-linear functions can only be implemented efficiently for small word sizes; they are generally implemented by lookup tables and these tables have a size that increases exponentially with the block size. Linear functions can be implemented efficiently for large block sizes, but are not very secure. Popular block ciphers such as AES and 3DES combine these two possibilities: A block cipher round comprises a key-addition step and two layers. The first of these layers is specified by a set of substitution boxes called S-boxes. An S-box is a non-linear function on small words of, say, k bits (typically the word size is a byte or a nibble). The input is split into k-bit words and each word is fed to an S-box. In AES and DES the layer does not create a dependency between bits of different words but only between bits of the same word. The second layer performs a linear function. The linear function operates on the complete n-bit data block. Hence, this layer creates a dependency between the bits of different words. Such block ciphers are called Substitution-Linear Transformation Networks.

FIG. 1b discloses a possible implementation of a block cipher round of an SLT cipher, say for use as a block cipher round in FIG. 1a.

Shown is the round input 130. The round input is a digital, say binary, data of block size width. A shown the round input is given as a number of round input words 132-136. Each word is of the size of a substitution box, say 4 or 8 bits. The round has a substitution layer 140. The substitution layer 140 comprises s-boxes 142-146. Each S-box implements a function of a round input word to a round input word. The functions are typically non-linear. Say non-linear with respect to the XOR operation. For each one of the words in input block 130 a different s-box may be used. One may also use the same S-box for all words. Note that before application of substitution layer 140 a round key may be added, say an xor of a round key of block size with round input 130. However, we will assume that the round key has been incorporated in the substitution layer 140 using partial evaluation.

On the combined results of the S-boxes 142-146 in the substitution layer, say the results are concatenated, a linear transformation 150, say a matrix operation is applied. The linear operation may be made up of multiple linear combinations, say shifting of words etc, as in AES. The result of linear transformation 150 is the round output 160, here shown as multiple round output words 162-166.

Substitution layer 140 takes as input a substitution layer input 130, in this case of the block size, in this case an intermediate result, and transforms it into a substitution layer output by substituting multiple words with other words. The S-boxes may be look-up tables. The substitution layer 140 is fully parallel, each S-box only depends on exactly one round input word; each S-box produces as output one round output word. The round output words are not used again in this substitution layer. In other words the substitution layer 140 does not have a substitution box that is arranged to receive as input a combination of at least part of the outputs of more than one further substitution boxes in the same substitution layer.

Typically, a device implementing a block cipher of FIGS. 1a and 1b comprise a microprocessor which executes appropriate software stored at the device; for example, that software may have been downloaded and stored in a corresponding memory, e.g., a volatile memory such as RAM or a non-volatile memory such as Flash (not shown).

In mathematical notation a general, in an SLT network a non-linear function on n bits is formed from m small, preferably highly, non-linear functions (S-boxes) $S_1$, $S_2$, ..., $S_m$ (142-146) by mixing the n output bits of $S_1$, $S_2$, ..., $S_m$ via a linear transformation 150.

FIG. 1b shows the structure of a typical SLT network. The input 130 of a round is split into m equally sized words $x_1$, $x_2$, ..., $x_m$ of k bits (note: n=mk), shown as 132-136. Common word lengths are 4 to 8 bits (e.g. 6 bits for 3DES and 8 bits for AES). The input is XORed with a round key (not shown separately in FIG. 1b) and the result of this operation is fed to m S-boxes $S_1$, $S_2$, ..., $S_m$ (142-146), i.e. word 132 is fed to s-box 142, word 134 to s-box 136, each word of input 130 is fed to a corresponding s-box. For example, word i is fed to S-box $S_i$. One may combine the round key addition functions $\oplus K_i$ and $S_i$ in a single function from k to k bits. We denote this function by $T_i$. Next a linear transformation 150 is applied to the output of the S-boxes. A linear transformation may be represented as the multiplication with a matrix M. The result gives the output of the round. The round output may be used as the input to the next round, may be used as output of the block cipher, or may be processed and the used as output to the block cipher; For example, a final round key addition or a final permutation may be applied in a final round that differs from previous rounds.

The inventors found that in general SLT block ciphers of the type shown in FIGS. 1a and 1b have vulnerabilities with respect to deriving obfuscated implementations for them, in particular such as white-box implementations. Substitution layers are shown herein that are better suited better for an obfuscated implementation.

A substitution layer transforms an input block into an output block by successively substitution boxes. Some substitution boxes provide part of the substitution layer output, e.g., some bits of an output box are directly used as part of the substitution layer output; these boxes may be referred to as output boxes. Some substitution boxes in the layer receive input from the substitution layer input, we may refer to these boxes as input boxes. Preferably, each part of the substitution layer output is obtained from an output of an s-box in that layer; Preferably, each part of the substitution layer input is used as input for an s-box in that layer.

If the substitution layer will be used in an SLT network, the substitution layer should be invertible. Moreover, the input and output size of such a substitution layer are equal to the block size. However, if the substitution layer is used in a different structure, e.g., to replace the substitution layer in Feistel type networks, such as DES, the layer need neither be invertible nor do the input and output sizes need to be equal to the block size. In fact one may even have that the size of the substitution layer input is not equal (typically larger) than the substitution layer output.

Note that substitution layers as described herein have the advantage that the non-linear part of encodings cannot be isolated from an affine part of the input/output encoding. Such a split is particularly problematic in SLT ciphers since it directly leads to attacks on these ciphers. However, such a weakness is undesirable in any block cipher, in particular if they are to be implemented a context of the white-box attack model.

In FIGS. 2-4, 5a and 5b examples are shown of substitution layers which do not suffer from this weakness. These substitution layers may directly be used in the SLT cipher shown in FIGS. 1a and 1b by replacing substitution layer 140 with the substitution layers shown below. Next, it is even possible to remove linear transformation 150, in this case some or all rounds only contain a substitution layer and possible a round key addition. This can be done, for example, if the substitution layer has full diffusion. One way to establish this is as to require that each bit of the substitution layer output depends on each bit of the substitution layer input. One criterion to assure this is to require that for each bit location x in the substitution layer output and each input bit location y in the substitution layer input, there exists two substitution layer inputs w1 and w2 that differ only in bit location y, and which have the property that the substitution layer output for w1 and w2 differ at least in bit location x. Ideally, this property should hold for each round key, but for practical purposes, one may be satisfied if it has been established for one round key, say randomly chosen, or even fixed such as all zero.

In more advanced application one may also require that the avalanche criterion is satisfied (flipping any bit in an input, say round input, gives a probability of a ½ of flipping any bit in the output, plus or minus a probability margin).

See for example the paper "Avalanche and Bit Independence Properties for the Ensembles of Randomly Chosen n×n S-Boxes", by Işll Vergili and Melek Yücel; see e.g. section 2.1 for a definition of the avalanche criterion. The avalanche criterion is considered to be an important cryptographic property of block ciphers which says that a small number of bit differences in the input plaintext leads to an avalanche of changes, that is, results in a large number of ciphertext bit differences. More formally, a function satisfies the avalanche criterion if whenever one input bit is changed, on the average, half of the output bits change. Exact satisfaction of this definition of the avalanche criterion is not realistic, and an error interval is allowed. The avalanche criterion may be used on the block cipher level as well as on the s-box level.

In general one may use a substitution layer as below as a large S-box created from smaller ones. The large S-boxes can next be used in a Substitution-Linear Transformation Network in a similar way as the smaller ones, but also in a Feistel network, or generally as a replacement of a substitution box. Also in this way we can create a block cipher for which more secure obfuscated implementations exist. A new approach is thus obtained for creating a non-linear function on n bits from small S-boxes. This non-linear function is more suited for an obfuscated implementation. In FIGS. 2-4, 5a-5b a parallel application of the S-boxes as shown in FIG. 1b is not used but a networked application of the S-boxes. That is, instead of directly feeding the output of all the S-boxes to the linear transformation 150, parts of the outputs of part of the S-boxes is used as input to other S-boxes.

In the figures s-boxes are depicted as boxes, an arrow towards an s-box depicts an input to that s-box of at least 1 bit, an arrow away from an s-box depicts an output of at least one bit.

Figure 2:
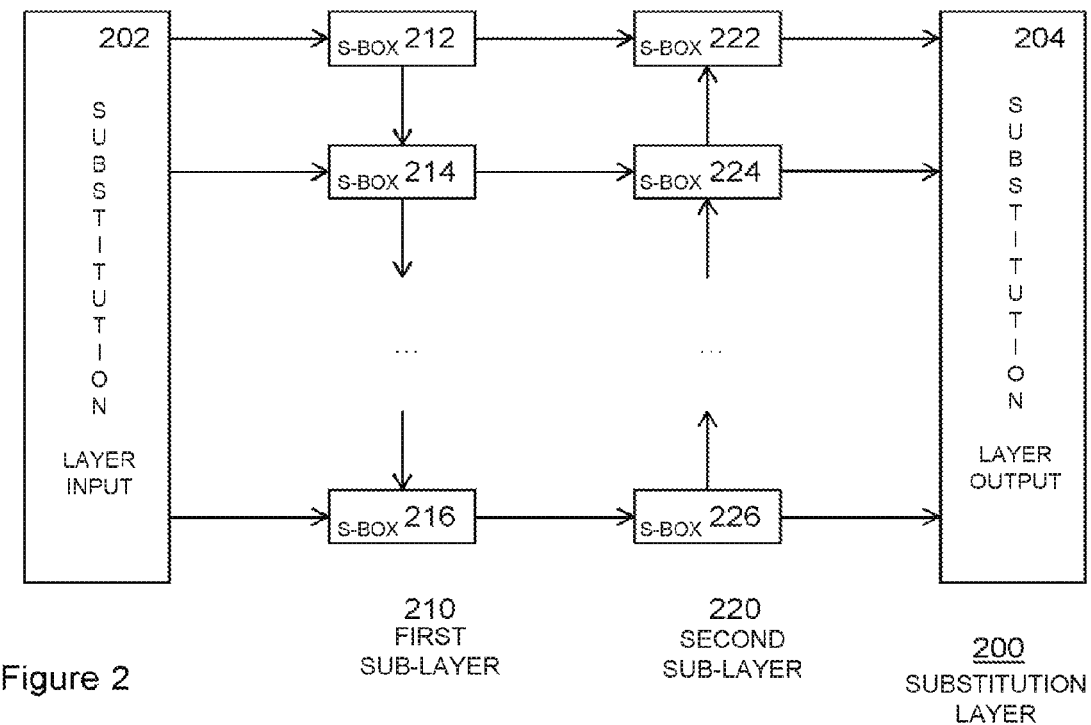
FIGS. 2-4 and 5a are block diagrams illustrating substitution layers.

FIG. 2 shows a substitution layer 200. Shown is a substitution layer input 202 and a substitution layer output 204. The substitution layer 200 has a first sub-layer 210 and a second sub-layer 220. First sub-layer 210 comprises substitution boxes 212-216 and second sub-layer 220 comprises substitution boxes 222-226.

Each substitution box in first sub-layer 210 receives all or part of its input from the substitution layer input 202. A first substitution box 212 in first sub-layer 210 receives only input from substitution layer input 202, each next substitution box in first sub-layer 210 receives input both from a previous substitution box and from the substitution layer input 202. For example, substitution box 212 receives input from substitution layer input 202, say 8 bits. Substitution box 214 receives input from substitution layer input 202, say 4 bits, and input from the output of substitution layer 212 say also 4 bits.

In an embodiment, each substitution box takes an even number of input bits, receiving half from a previous output and half from the layer input 202 (except the first who takes all from the layer input 202). But these numbers may be varied if needed, say some may take 2 bits, or 1 bit from a previous output, others may take all but 1, etc.

Each substitution box in second layer 220 receives input from a corresponding s-box in the first layer 210. A first substitution box 226 only receives input from a corresponding s-box 216 in the first layer 210; each next substitution box receives input from a corresponding s-box in the first layer 210 and an a previous s-box in the second layer 220.

The inputs of the s-boxes in first layer 210 together make up the layer input 202. The outputs of second layer 220 together make up the layer output 204.

Note all substitution boxes except s-box 226 in the second layer receive as input a combination of at least part of the outputs of more than one further substitution boxes in the same substitution layer, namely one s-box in the first sub-layer 210 and a previous s-box in the same sub-layer. This feature blocks a class of simplification of the white-box encodings applied to the s-boxes.

Note also that the output of each S-box in the second sub-layer depends on the inputs of each s-box in the first layer. This feature makes is highly likely, especially with larger s-boxes, that the substitution layer will also cause full diffusion (each output bit depending on each input bit). The S-boxes are preferably chosen as non-linear functions. For example, one may take the AES s-box or a random non-linear function; possibly with a round key added in.

As an example, one may take as block size a power of 2 larger or equal to 32, say 128, and use this also for the size of input 202. Each s-box may receive a smaller power of 2 as input and output, say 4 or 8 bits. When an s-box takes input or sends output to more than one source, the input or output is equally divided over the two sources, say a most and least significant half (other divisions are possible).

FIG. 2 also show the properties of long dependency chains. For example, there are a first (212), second (214), third (224) and fourth (222) substitution box having the property that a fourth substitution box receives input from the output of a third substitution box, the third substitution box receives input from the output of a second substitution box, the second substitution box receives input from the output of a first substitution box. This makes chaining irregularities through the S-boxes, such as for differential or linear cryptanalysis, particularly hard.

Figure 3:
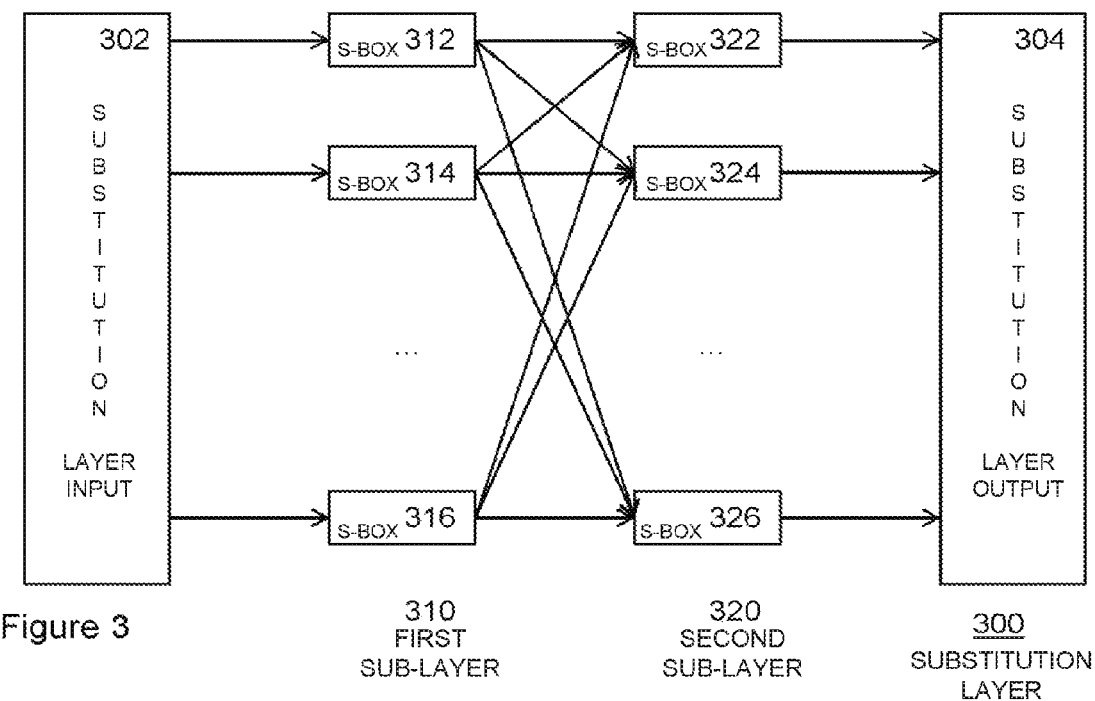

FIG. 3 shows a substitution layer 300. Shown are a substitution layer input 302 and a substitution layer output 304. The substitution layer 300 has a first sub-layer 310 and a second sub-layer 320. First sub-layer 310 comprises substitution boxes 312-316 and second sub-layer 320 comprises substitution boxes 322-326.

Each substitution box in first sub-layer 310 receives all its input from the substitution layer input 302. Each substitution box in second sub-layer 320 receives all its input from outputs of substitution boxes in substitution layer 310. Each substitution box in the second sub-layer 320 receives input from at least two other substitution boxes or more. For example, there may be 8 s-boxes in the first and second layer, each s-box having 8 bits in an output. Each s-box in the second layer receiving 1 bit from each s-box in the first layer, so that each output of the first sub-layer 310 is used exactly ones.

The substitution layer of FIG. 3 does not have the long chain property of FIG. 2, however, it does have the following property: the substitution layer comprises a first (312), second (314), third (324) and fourth (322) substitution box having the property that the fourth and third substitution box both receive input from the output of a first and second substitution box.

Figure 4:
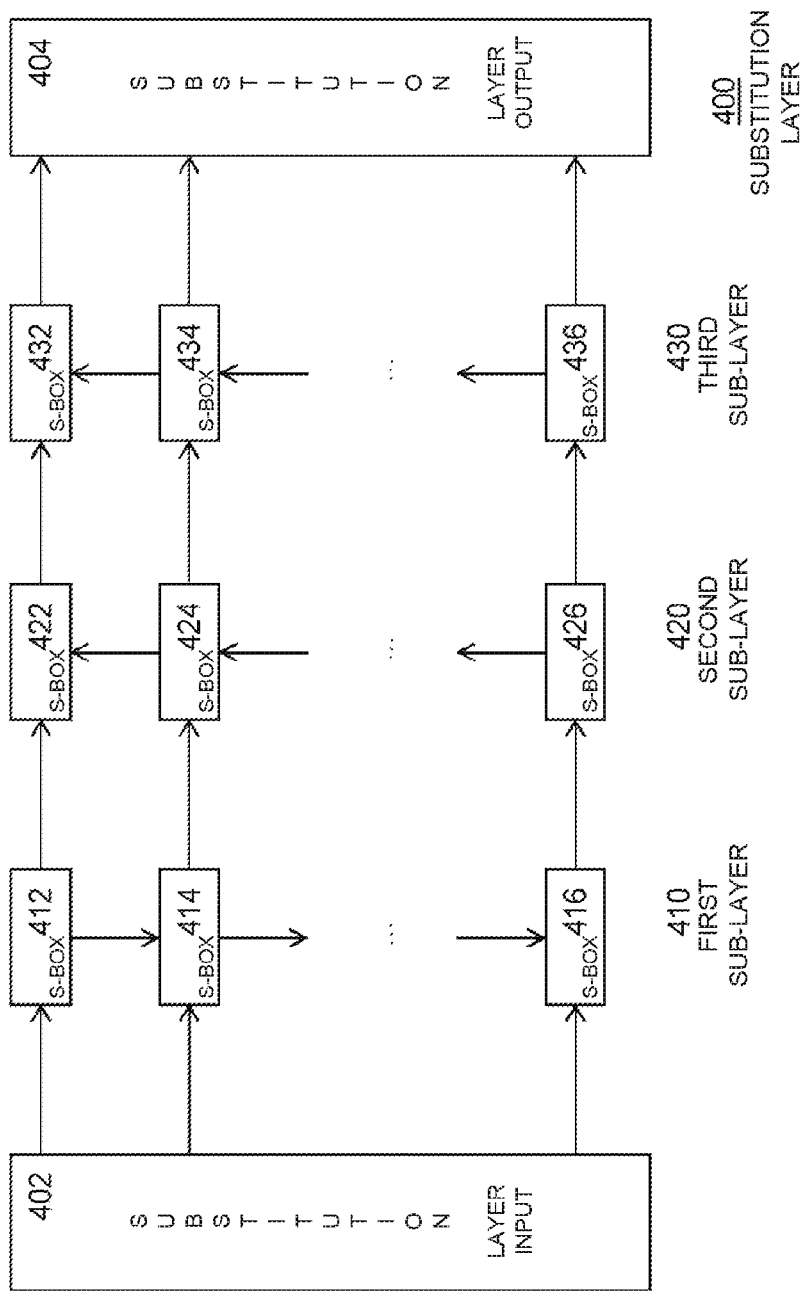

FIG. 4 shows a variant of FIG. 2, in which 3 sub-layers are used. Shown is a substitution layer 400 receiving a substitution layer input 402 and producing a substitution layer output 404. Substitution layer 400 comprises a first sub-layer 410 having substitution boxes 412-416, a second sub-layer 420 having substitution boxes 422-426, and a third sub-layer 430 substitution boxes 432-436. The number of sub-layers may be increased to larger than 3, or even up to say 32 (or higher), or 64. Such a substitution layer may be used without linear diffusion layer 150.

Note that all of the substitution layers shown in FIGS. 2, 3, and 4 are invertible whenever the individual s-boxes are invertible.

Figure 5A:
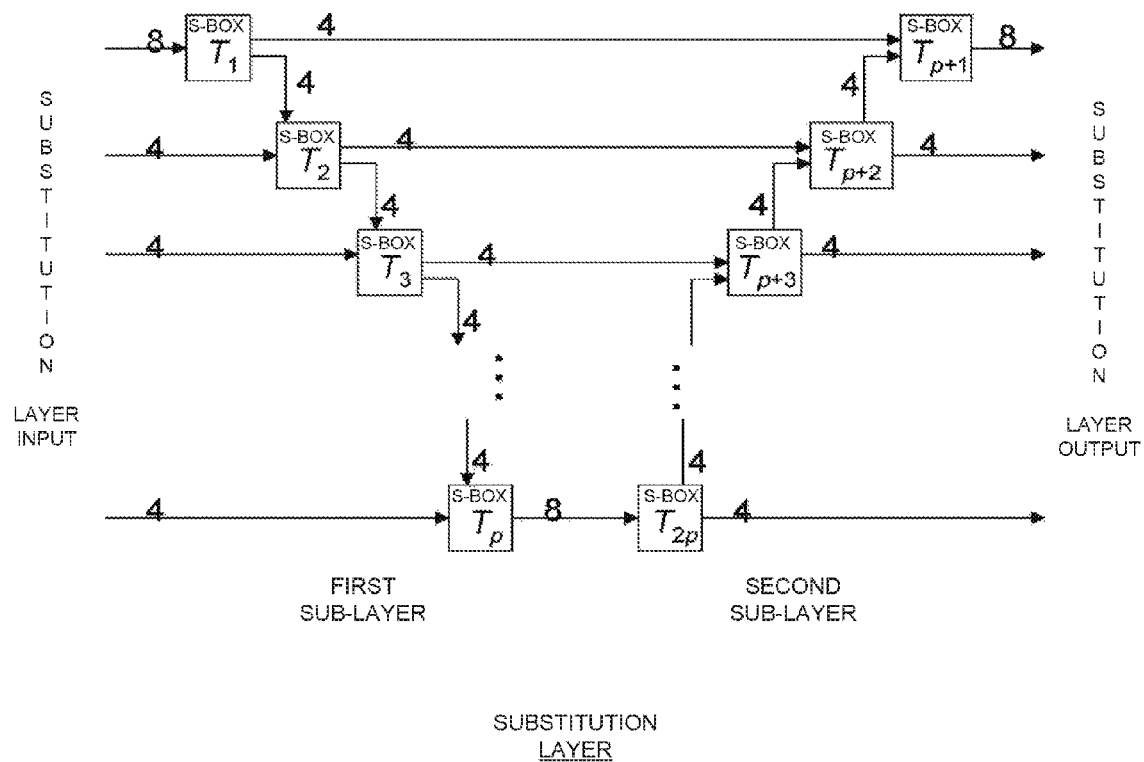

FIG. 5a shows a version of FIG. 2, in which round keys are included in the s-boxes. In this example, the round words have size k=8. The number of S-boxes used is given by p. The network of S-boxes consists of a left (first) layer and a right (second) layer. In the left layer, the output byte of an S-box $T_i$ with i<p is split into two nibbles (also other splits of a byte into 2 words are possible). One nibble is given as input to S-box $T_{p+I}$ of the right layer and the other one is fed to the next S-box $S_{i+1}$ in the left layer.

Preferably, each output bit of the network is influenced by each input bit of the network. This property (the diffusion property) is the reason for introducing the linear transformation layer in an SLT cipher. To realize, or at least approximate, this property, from each S-box in the left layer there is a path in the network to each S-box in the right layer.

Consider the network of S-boxes $T_1, T_2, \ldots, T_2$ given in the section above. By taking p=3, we can construct a non-linear bijective function F on 16 bits. To implement this function we need 6 lookup tables: one for each $T_i$. These lookup tables consist of $2^8$ rows, where each row contains one byte. Hence, the storage requirement is 1,536 bytes. In comparison, if we would implement an arbitrary 16-bit S-box G by a single lookup table, this would require a lookup table consisting of $2^{16}$ rows, where each row consists of 2 bytes. This implies a storage requirement of 131,072 bytes. More generally, the storage requirement for F is $2p \cdot 2^8$ while the storage requirement for G is $2^{4+4p}$. Hence, the storage requirement of F grows linearly in p and the storage requirement of G grows exponentially in p.

FIG. 5a accepts an input of size k(p+1)/2, assuming all input/output splits are in two k/2 size parts. If it is desired to have a power of two as input, one should select k and (p+1) as powers of two.

The substitution layer obtained by the construction of FIG. 5a may be employed to construct a block cipher on n bits from F in various ways. We restrict ourselves to explaining how a single round of the block cipher can be constructed. The complete block cipher is simply obtained by sequencing a number of such rounds. Choose p such that F becomes a function on n bits, or choose p such that F becomes a function on l bits, where l divides n, i.e., n=l·r for some r. Generate r of such functions (denoted by $F_1, F_2, \ldots, F_r$) An SLT network as depicted in FIGS. 1a and 1b may be constructed wherein the S-box 142-146 given by $F_i$ and m=r. The obtained cipher is better suited for an obfuscated implementation in the context of a white-box attack model than a standard SLT cipher, and in particular for a white-box implementation.

Figure 5B:
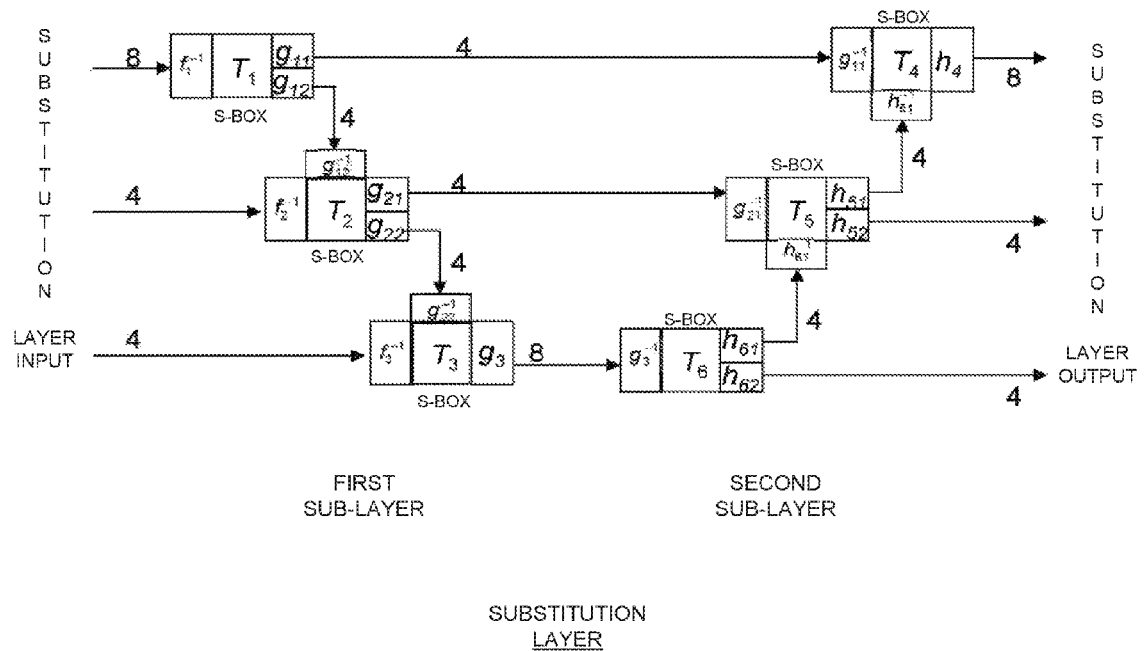
FIG. 5b is a block diagram illustrating a substitution layer including encodings.

FIG. 5b. In an obfuscated implementation hides the key from an attacker that has full access to the implementation. A technique that is known per se, for doing this is the following: first express the function that is to be obfuscated as a table network, i.e., the function is computed by network of tables in which each table either receives as input part of the network input, e.g., the block cipher input, or output of other tables, and produces as output block cipher output and/or inputs to other tables. Next the tables are obfuscated by applying encoding to the tables. By making sure that encoding on outputs and inputs cancel, one ensures that the entire network computes the same function, yet this punctuality is distributed over the entire network. Since the substitution networks are already a table network, this technique lends itself well to the substitution networks described herein.

We implement the S-boxes $T_i$ in the network of FIG. 5a by lookup tables. We next obfuscate these lookup tables (which contain the key) by encoding their input and output. Encoding the input and output of a table $T_i$ with bijective functions $f_i$ and $g_i$, respectively, corresponds to replacing table $T_i$ by $g_i \bigcirc T_i \bigcirc f_i^{-1}$. Hence, we incorporate in it an input decoding and an output encoding. To see that the application of encodings realizes obfuscation, observe that encoding the input of a lookup table changes the order of its rows and that encoding the output changes the value of the rows.

The encodings are applied in such a way that the functionality of the total implementation is not affected. This is done by choosing the input encoding of a table, such that it matches the encoding that has been put on its input data by the preceding tables in the network. This is illustrated in FIG. 5b.

If we apply the a similar obfuscation technique to an SLT cipher, then the resulting implementation is not secure: Several attacks are known for extracting a key from such obfuscated implementations. All these attacks exploit vulnerabilities that are typical for SLT ciphers and that are not present in the cipher defined by FIG. 5b.

Figure 6:
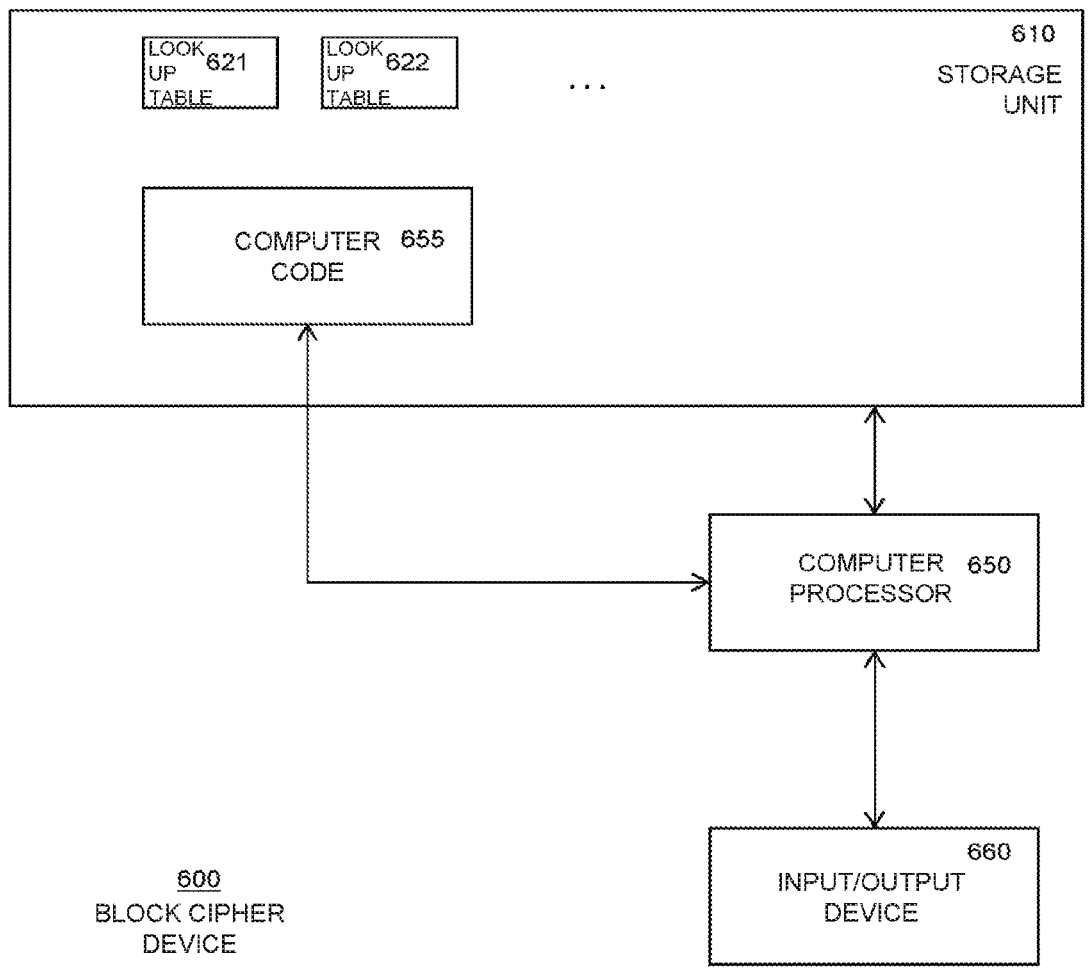
FIG. 6 is a block diagram illustrating a computing device, It should be noted that items which have the same reference numbers in different Figures, have the same structural features and the same functions, or are the same signals. Where the function and/or structure of such an item has been explained, there is no necessity for repeated explanation thereof in the detailed description.

FIG. 6 shows a block cipher device 600 comprising a storage device 610, a computer processor 650, and an I/O device 660. Storage device 610 stores look-up tables (shown are look-up tables 621 and 622) and computer code 655. The look-up tables correspond to substitution boxes possibly in encoded form, say white-box form. The I/O device 660 may be a network device for receiving and transmitting messages over a network.

In operation, I/O device 660 may receive an encoded message. A message block is extracted from the received message. Processor 650 under control of computer code 655 applies a block cipher to the message block. For example, processor 650 may apply a substitution layer to the message block as expressed in the look-up tables. For example, storage device 610 may store a table indicating which look-up table needs to be applied to what data. After the substitution layer, processor 650 may apply a linear transformation. The latter may be expressed in code rather than in the form of a table. But the transformation may also be stored in the form of a table network. The latter is preferred in the context of the white-box attack model. In this fashion processor 650 applies a number of rounds, each with a substitution layer. If the key has been incorporated in the substitution layer, than no round key addition is needed in the rounds. When the block cipher is completed, and all rounds have been executed, processor 650 has access to the decrypted version of the received message block. When all block are decrypted, processor 650 may process the result, say display it if it was encrypted content etc.

Conversely, when there is a need to send encrypted communication, processor 650 applies the block cipher to a plaintext text block to obtain an encrypted message block. Sometimes the same block cipher may be applied in reverse to perform the opposite function, in this case encryption. However, in the context of a white-box attack model it may be preferable to have different implementations for encryption and decryption.

Note that there is no need to explicitly store in storage device 610 a cryptographic key. Rather the key is embedded in the block cipher itself. Due to obfuscating encoding and the properties of the substitution layer this key is hard to extract.

In an electronic block cipher method for encrypting or decrypting a message block of digital data, there is a storing step and an applying step. The storing step comprises storing multiple substitution boxes in the form of look-up tables, the multiple substitution boxes together forming a substitution layer of a block cipher, the substitution layer being arranged to take a substitution layer input and transforming it into a substitution layer output, at least one substitution box being arranged to receive as input a combination of at least part of the outputs of more than one further substitution boxes in the same substitution layer. In the applying step, the block cipher is applied to a message block of digital data by applying a sequence block of cipher rounds to the message block, one of the block cipher rounds comprising the substitution layer.

Many different ways of executing the method are possible, as will be apparent to a person skilled in the art. A method according to the invention may be executed using software, which comprises instructions for causing a processor system to perform the method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS

100 a block cipher
110 a message input block
112-116 block cipher rounds
120 a message output block
130 a round input
132-136 round input words
140 a substitution layer
142-146 substitution boxes
150 a linear transformation
160 a round output
162-166 round output words
200 a substitution layer
202 a substitution layer input
204 a substitution layer output
210 a first sub-layer
220 a second sub-layer
212-226 substitution boxes
300 a substitution layer
302 a substitution layer input
304 a substitution layer output
310 a first sub-layer
320 a second sub-layer
312-326 substitution boxes
400 a substitution layer
402 a substitution layer input
404 a substitution layer output
410 a first sub-layer
420 a second sub-layer
430 a third sub-layer
412-436 substitution boxes
600 a computing device
610 a storage device
621, 622 look-up tables
650 a computer processor
655 computer code
660 I/O device

The invention claimed is:

1. An electronic block cipher device configured for one selected from the group consisting of (i) encrypting and (ii) decrypting a message block of digital data, the electronic block cipher device comprising:
 a first device (i) for receiving input digital data messages and (ii) for transmitting one selected from the group consisting of (ii)(a) unencrypted output digital data messages based upon received input digital data messages that are encrypted and (ii)(b) encrypted output digital data messages based upon received input digital data messages that are unencrypted;

a storage unit for storing multiple non-linear substitution boxes in the form of look-up tables, the multiple substitution boxes together forming a substitution layer of a block cipher, wherein the block cipher includes rounds, wherein a round comprises at least the substitution layer, wherein the substitution boxes in the substitution layer are obfuscated by encoding their input and output, the substitution layer being arranged to take a substitution layer input and transforming it into a substitution layer output, at least one substitution box of the multiple substitution boxes being arranged to receive as input a combination of at least part of the outputs of more than one further substitution boxes of the multiple substitution boxes in the same substitution layer; and a control unit operatively coupled to the first device and the storage unit, wherein the control unit is configured to (i) extract from the received input digital data messages, a message block of digital data, and (ii) apply the block cipher to the message block of digital data by applying a sequence of block cipher rounds to the message block of digital data, wherein one of the block cipher rounds comprises the substitution layer, and wherein the substitution layer further comprises one selected from the group consisting of (a) multiple sub-layers, a first sub-layer of the multiple sub-layers being arranged to receive as input the substitution layer input, next sub-layers being arranged to receive as input the output of a previous substitution layer, and one of the next sub-layers being a last sub-layer being arranged to produce the substitution layer output, further wherein a first substitution box in the first sub-layer of multiple sub-layers receives input only from the substitution layer input, and a second substitution box in the first sub-layer receives input both from the substitution layer input and from an output of the first substitution box, and (b) a first, a second, a third and a fourth substitution box having the property that the fourth substitution box receives input from the output of the third substitution box, the third substitution box receives input from the output of the second substitution box, the second substitution box receives input from the output of the first substitution box, wherein the first and second substitution box receive a part of their respective input from the substitution layer input, and the third and fourth substitution box produce as part of their respective output a part of the substitution layer output.

2. The electronic block cipher device as in claim 1, further wherein at least one substitution box of the multiple substitution boxes is arranged so that a first part of the digital output of the at least one substitution box is used as part of the input of a further substitution box in the same substitution layer as the at least one substitution box and so that a second part of the digital output of the at least one substitution box is used as part of the input for yet a further different substitution box in the same substitution layer.

3. The electronic block cipher device as in claim 1, wherein the substitution layer comprises the multiple sub-layers, the first sub-layer of the multiple sub-layers being arranged to receive as input the substitution layer input, next sub-layers being arranged to receive as input the output of a previous substitution layer, and one of the next sub-layers being a last sub-layer being arranged to produce the substitution layer output, and wherein the first substitution box in the first sub-layer receives input only from the substitution layer input, and the second substitution box in the first sub-layer receives input both from the substitution layer input and from the output of the first substitution box.

4. The electronic block cipher as in claim 1, wherein the substitution layer comprises the first, second, third and fourth substitution box having the property that the fourth substitution box receives input from the output of the third substitution box, the third substitution box receives input from the output of the second substitution box, the second substitution box receives input from the output of the first substitution box, and wherein the first and second substitution box receive a part of their respective input from the substitution layer input, and the third and fourth substitution box produce as part of their respective output a part of the substitution layer output.

5. The electronic block cipher as in claim 1, wherein the substitution layer further comprises the first, second, third and fourth substitution box having a property that the fourth and third substitution box both receive input from the output of the first and second substitution box.

6. The electronic block cipher device as in claim 1, wherein the control unit is further configured to produce, starting from the message block of digital data, a sequence of intermediate data blocks of a same data size as the message block of digital data, wherein each next intermediate data block depends on a previous intermediate data block.

7. The electronic block cipher device as in claim 6, wherein the substitution layer (i) receives, as substitution layer input, an intermediate data block and (ii) produces, as output, a next intermediate data block.

8. The electronic block cipher device as in claim 1, wherein the sequence of block cipher rounds transform the message block of digital data according to a cryptographic round key, wherein the round key is incorporated in the substitution layer of the block cipher round.

9. An electronic block cipher method for one selected from the group consisting of (i) encrypting and (ii) decrypting a message block of digital data, the electronic block cipher method comprising:

storing, via a storage unit, multiple non-linear substitution boxes in the form of look-up tables, the multiple substitution boxes together forming a substitution layer of a block cipher, wherein the block cipher includes rounds, wherein a round comprises at least the substitution layer, wherein the substitution boxes in the substitution layer are obfuscated by encoding their input and output, the substitution layer being arranged to take a substitution layer input and transforming it into a substitution layer output, at least one substitution box of the multiple substitution boxes being arranged to receive as input a combination of at least part of the outputs of more than one further substitution boxes of the multiple substitution boxes in the same substitution layer; and applying, via a control unit, the block cipher to a message block of digital data by applying a sequence block of cipher rounds to the message block of digital data, wherein one of the block cipher rounds comprises the substitution layer, and wherein the substitution layer further comprises one selected from the group consisting of (a) multiple sub-layers, a first sub-layer of the multiple sub-layers being arranged to receive as input the substitution layer input, next sub-layers being arranged to receive as input the output of a previous substitution layer, and one of the next sub-layers being a last sub-layer being arranged to produce the substitution layer output, further wherein a first substitution box in the first sub-layer of multiple sub-layers receives input only from the substitution layer input, and a second substitution box in the first sub-layer receives input both from the substitution layer input and from an output of the first substitution box, and (b) a first, a second, a third and a fourth substitution box having the property that the fourth substitution box receives input from the output of the third substitution box, the third substitution box receives input from the output of the second substitution box, the second substitution box receives input from the output of the first substitution box, wherein the first and second substitution box receive a part of their respective input from the substitution layer input, and the third and fourth substitution box produce as part of their respective output a part of the substitution layer output.

10. A non-transitory computer readable medium embodied with a computer program that comprises a set of instructions executable by a computer for enabling the computer to perform the method of claim 9 for encrypting or decrypting a message block of digital data according to a block cipher, when the computer program is executed on the computer.

\* \* \* \* \*